United States Patent
Spatafora

[11] Patent Number: 6,155,774
[45] Date of Patent: Dec. 5, 2000

[54] UNIT FOR FORMING STACKS OF ARTICLES

[75] Inventor: Mario Spatafora, Bologna, Italy

[73] Assignee: Azionaria Costruzioni Macchine Automatiche A.C.M.A. S.p.A., Bologna, Italy

[21] Appl. No.: 09/257,419

[22] Filed: Feb. 25, 1999

[30] Foreign Application Priority Data

Feb. 25, 1998 [IT] Italy .................................. BO98A0110

[51] Int. Cl.⁷ .................................................. B65H 1/18
[52] U.S. Cl. ................................... 414/789.9; 414/790.3; 414/792.8; 414/793.4
[58] Field of Search ............................. 414/789.9, 790.3, 414/792.4, 792.8, 793.4, 795.1

[56] References Cited

U.S. PATENT DOCUMENTS

| | | | |
|---|---|---|---|
| 1,208,802 | 12/1916 | Lienau et al. | 414/790.3 |
| 2,819,807 | 1/1958 | Petrea | 214/6 |
| 3,657,860 | 4/1972 | Franklin | 414/790.3 |
| 3,712,487 | 1/1973 | Eberle | 414/795.1 |
| 4,314,785 | 2/1982 | LaFleur, Jr. et al. | 414/46 |
| 4,378,938 | 4/1983 | Staniszewski | 414/792.4 |
| 4,938,656 | 7/1990 | Gamberini et al. | 414/798.5 |
| 4,957,409 | 9/1990 | Fukao et al. | 414/790.3 |
| 5,236,300 | 8/1993 | Aida et al. | 414/795.1 |
| 5,439,344 | 8/1995 | Yoshizuka et al. | 414/789.1 |
| 5,823,738 | 10/1998 | Spatafora et al. | 414/795.1 |

FOREIGN PATENT DOCUMENTS

| | | |
|---|---|---|
| 0784028 | 7/1997 | European Pat. Off. . |
| 0806388 | 11/1997 | European Pat. Off. . |
| 1127810 | 4/1962 | Germany . |

*Primary Examiner*—Joseph A. Fischetti
*Attorney, Agent, or Firm*—Ladas & Parry

[57] ABSTRACT

A unit for forming stacks of articles, the unit having a stacking device for forming the stacks, an input supply device for feeding the articles to the stacking device in a first supply direction, and an unloading assembly for unloading the stacks off the stacking device and feeding the stacks in a second supply direction perpendicular to the first supply direction.

9 Claims, 2 Drawing Sheets

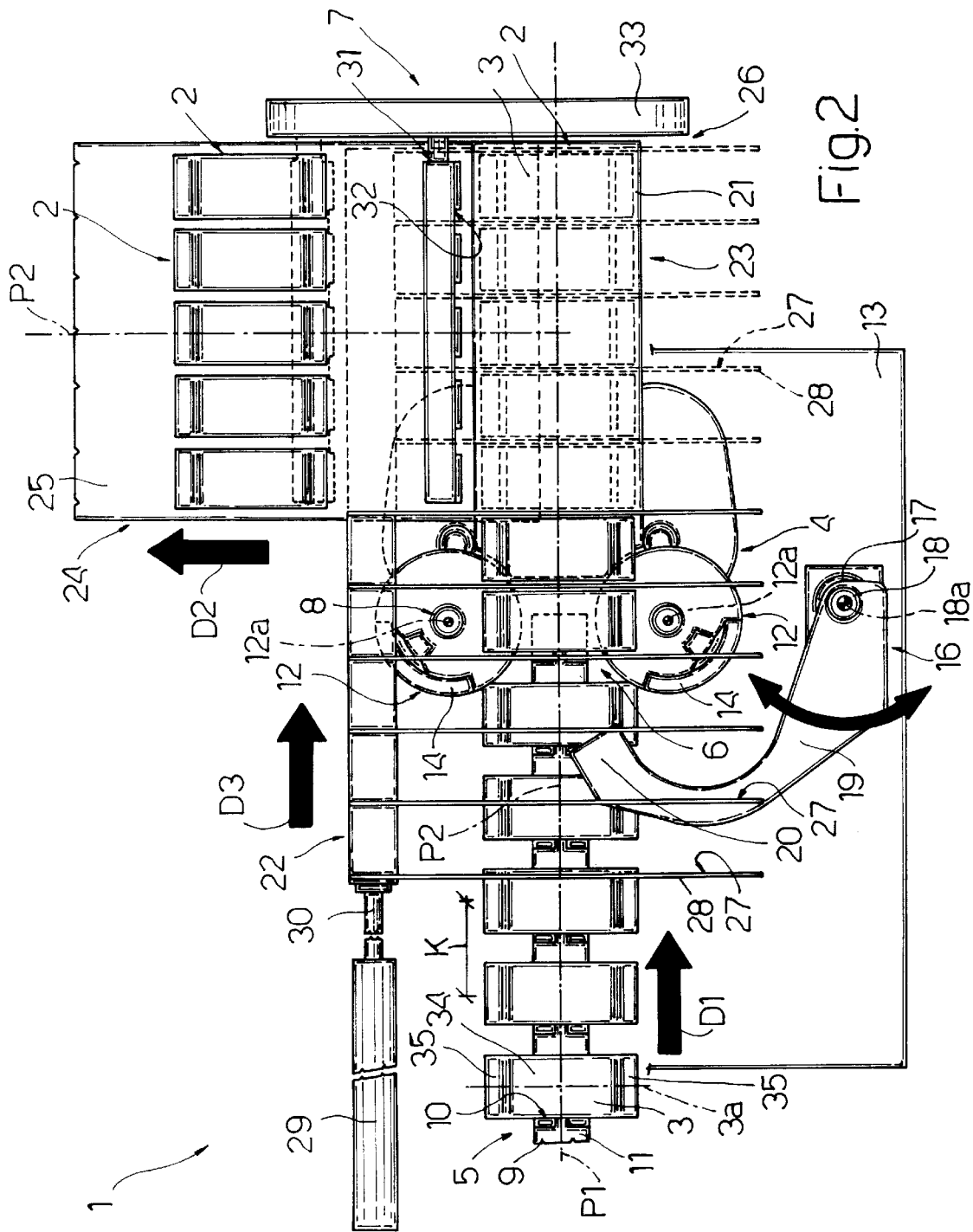

UNIT FOR FORMING STACKS OF ARTICLES

The present invention relates to a unit for forming stacks of articles.

BACKGROUND OF THE INVENTION

Known units for forming stacks of articles normally comprise a stacking device for forming the articles into stacks; a supply device for feeding the articles to the stacking device in a given supply direction; and a further supply device for feeding the stacks of articles from the stacking device along an unloading path extending parallel to the supply direction.

For example, U.S. Pat. No. 4,314,785 discloses a unit for forming stacks of articles, the unit comprising stacking means for forming the stacks, supply means for feeding the articles to an input of the stacking means in a first supply direction, and unloading means in series with the stacking means to unload the stacks from an output of the stacking means and feed the stacks in a second supply direction perpendicular to the first supply direction. The unloading means comprise a plate for accumulating the stacks and located at an unloading level higher than a supply level defined by the input of the stacking means.

Though highly reliable and easy to produce and operate, units for forming stacks of articles of the above type have several drawbacks, mainly on account of their structure, which prevents their being used in confined work areas.

SUMMARY OF THE INVENTION

It is an object of the present invention to provide a straightforward, low-cost unit for forming stacks of articles, designed to eliminate the aforementioned drawbacks.

According to the present invention, there is provided a unit for forming stacks of articles, the unit comprising stacking means for forming the stacks, said stacking means having an input defining a supply level and an output; supply means for feeding the articles to said input in a first supply direction; and unloading means in series with said stacking means to unload the stacks from said output and feed the stacks in a second supply direction perpendicular to said first supply direction; said unloading means comprising a plate for accumulating said stacks, said plate being located at an unloading level higher than said supply level; characterized in that said stacking means comprising a lifting device movable selectively through said output to lift each stack to said unloading level.

BRIEF DESCRIPTION OF THE DRAWINGS

The invention will now be described by way of example with reference to the accompanying drawings, in which:

FIG. 2 shows a larger-scale plan view of the FIG. 1 unit.

DETAILED DESCRIPTION OF THE INVENTION

Figure 1:
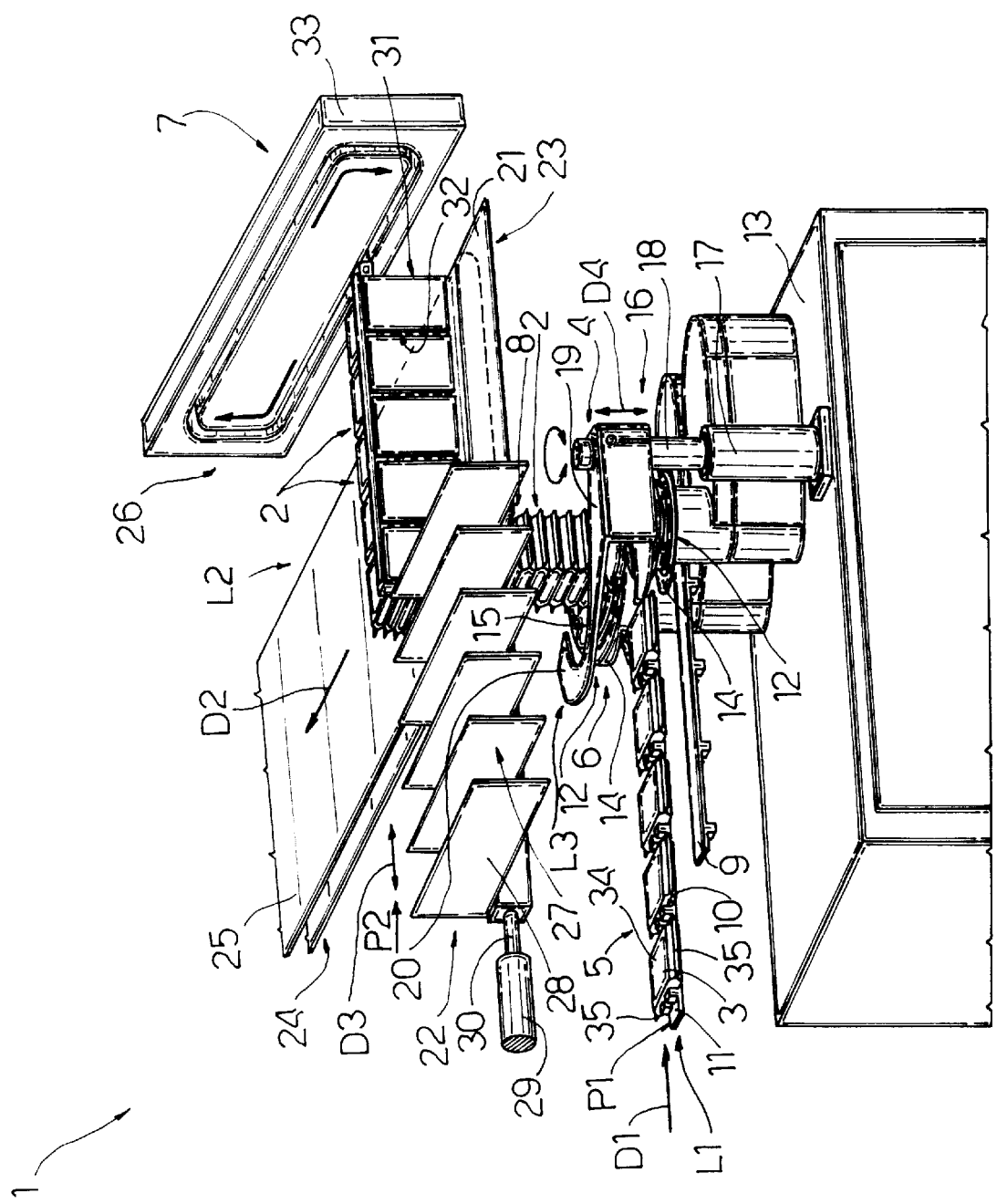
FIG. 1 shows a view in perspective, with parts removed for clarity, of a preferred embodiment of the unit for forming stacks of articles according to the present invention.

Number 1 in FIGS. 1 and 2 indicates as a whole a unit for forming stacks 2 of articles 3, and which comprises a double-screw stacking device 4 for forming stacks 2; a supply device 5 for successively feeding articles 3 in a supply direction D1 to an input 6 of stacking device 4; and an unloading assembly 7 located in series with stacking device 4 to unload stacks 2 from an output 8 of stacking device 4 and feed stacks 2 in a further supply direction D2 perpendicular to direction D1.

Device 5 comprises an endless conveyor belt 9, which defines an input path P1 of unit 1 extending up to input 6 of stacking device 4, has a number of conveying pockets 10, equally spaced with a spacing K, for conveying respective articles, and provides for continuously feeding articles 3 crosswise to the respective long longitudinal axes 3a of articles 3. Belt 9 has a horizontal conveying branch 11, which is located at a supply level L1 lower than the unloading level L2 of stacks 2 off stacking device 4, and extends through input 6 of stacking device 4.

Stacking device 4 comprises two counter-rotating screws 12, which are fitted, on opposite sides of conveying branch 11 of device 5, to a base 13, rotate about respective vertical axes 12a of rotation, and comprise respective oppositely-inclined threads 14 winding about respective axes 12a. More specifically, threads 14 are tangent to both input 6 and the sides of branch 11, and, being cut at the top by a surface crosswise to axes 12a, define a surface 15 for forming stacks 2 and which is located at an intermediate level L3 between levels L1 and L2.

Stacking device 4 also comprises a lift device 16 for lifting stacks 2 from level L3 to level L2, and which in turn comprises a linear actuator 17 fitted to base 13 alongside one of screws 12 and having an output arm 18 movable up and down in a lift direction D4 parallel to axes 12a, and a curved plate element 19 fitted to the top end of arm 18.

Lift device 16 also comprises a known angular actuator (not shown) associated with actuator 17 to move arm 18, about an axis 18a defined by arm 18 itself and in direction D4, between a lowered engaging position in which a square end portion 20 of curved element 19 is located at the same level L3 as surface 15 between threads 14, a raised unloading position in which portion 20 is located at level L2 at output 8, and a raised and/or lowered release position.

Unloading assembly 7 comprises a plate 21 at level L2 for accumulating stacks 2; and a pocket conveying device 22 movable in a supply direction D3 parallel to direction D1 and along an unloading path P2 extending through output 8 and through a switch station 23 defined by plate 21 and located downstream from output 8. Unloading assembly 7 also comprises a belt conveyor 24 having a conveying branch 25 coplanar with plate 21 and extending in direction D2 from station 23; and a blade device 26 for releasing stacks 2 from conveying device 22 and unloading stacks 2 off plate 21 onto conveyor 24.

Conveying device 22 comprises five pockets 27, each for receiving a respective stack 2 at output 8, and which are located in series and side by side with one another in direction D3, and are defined by six vertical walls 28 crosswise to direction D3. Conveying device 22 also comprises a linear actuator 29, the output arm 30 of which supports walls 28 and moves back and forth in direction D3 to arrest pockets 27 one after the other at output 8 and so feed pockets 27 in steps onto plate 21, and to withdraw pockets 27 all together off plate 21.

Blade device 26 comprises a blade 31, which is movable cyclically through switch station 23 in direction D2, and has four through openings 32 for the passage of walls 28 when unloading conveying device 22. Device 26 also comprises a cyclic actuator 33 located alongside conveyor 24 and at the end of plate 21, and which provides for moving blade 31 along a cyclic path while keeping blade 31 parallel to itself and perpendicular to direction D2.

More specifically, actuator 33 provides for moving blade 31 from an initial lowered position—in which blade 31 is adjacent to all of pockets 27 arrested in switch station 23 and containing respective stacks 2—to a final lowered position—in which blade 31 is located on conveying branch 25 of conveyor 24—and through two raised positions in which blade 31 is located at such a height over branch 25 and plate 21 as to fully clear stacks 2.

Unit 1 is mainly used for stacking so-called "pillow-pack" articles 3 comprising a central body 34, and two lateral tabs 35 at opposite ends of body 34 and crosswise to longitudinal axis 3a.

Articles 3 are housed inside conveying pockets 10 of device 5 with respective tabs 35 projecting laterally outwards of conveying branch 11 of belt 9, and are fed continuously by pockets 10 to input 6, where the two threads 14, rotating in opposite directions and at substantially constant angular speed about respective axes 12a, simultaneously engage both tabs 35 and lift each article 3 in direction D4.

Articles 3 are raised by threads 14 from level L1 to level L3 defined by forming surface 15, and remain with respective tabs 35 resting on screws 12 until a stack 2 is formed by stacking articles 3 underneath one another. Once a stack 2 is formed on surface 15, plate element 19—initially set to the lowered release position—is rotated about axis 18a, and square end portion 20—which, in horizontal section, is substantially the same size as body 34 of article 3—is inserted beneath the newly formed stack 2.

Actuator 17 is then operated to move element 19 in direction D4 and lift the newly formed stack 2 from level L3 to level L2; and portion 20 is positioned flush with plate 21 and just beneath walls 28, so that stack 2 is inserted inside a pocket 27 arrested at output 8. Once stack 2 is fully inserted inside respective pocket 27, pocket 27 is moved one step, equal to the width of pocket 27 itself, in direction D3 so that stack 2 slides off portion 20 onto plate 21.

When pockets 27 and respective stacks 2 have all been fed into switch station 23, blade device 26 unloads pockets 27 and feeds the stacks onto conveying branch 25 of conveyor 24.

Pockets 27 are unloaded by moving blade 31 into the initial lowered position and feeding blade 31 in direction D2 to engage the articles 3 stacked inside pockets 27 and slide stacks 2 off plate 21 onto conveyor 24, which is operated in steps to feed stacks 2 in direction D3. Once pockets 27 have been unloaded, actuator 29 resets one pocket 27 at output 8. The time taken by blade 31 to unload pockets 27, and by actuator 29 to reset a pocket 27 at output 8, is substantially equal to the time taken by stacking device to form a stack 2.

Articles 3 are therefore fed to input 6 singly and crosswise to respective axes 3a, and are subsequently fed parallel to axes 3a in direction D2 by conveyor 24 and device 26. Feeding stacks 2 of articles 3 out in a direction D2 perpendicular to the infeed direction D1 of articles 3 provides for reducing the length of unit 1, and so enabling unit 1, unlike units of considerable length for forming stacks 2 of articles 3, to be installed in confined workplaces.

What is claimed is:

1. A unit for forming stacks of articles, the unit (1) comprising:

stacking means (4) for forming the stacks (2), said stacking means (4) having an input (6) defining a supply level (L1) and an output (8); first supply means (5) for feeding the articles (3) to said input (6) in a first supply direction (D1); and unloading means (7) in series with said stacking means (4) to unload the stacks (2) from said output (8) and feed the stacks (2) in a second supply direction (D2) perpendicular to said first supply direction (D1); said unloading means (7) comprising a plate (21) for accumulating said stacks (2), said plate (21) being located at an unloading level (L2) higher than said supply level (L1); said stacking means (4) comprising a lifting device (16) movable selectively through said output (8) to lift each stack (2) to said unloading level (L2); said lifting device (16) being both vertically movable in a lift direction (D4) and rotatable about an axis parallel to the lift direction (D4), between a surface (15) for forming said stacks (2) and said output (8); said lift direction (D4) being perpendicular to said first supply direction (D1).

2. A unit as claimed in claim 1, wherein said unloading means (7) comprise second supply means (24, 26) movable parallel to said second supply direction (D2) and through a switch station (23) located along an unloading path (P2) downstream from said output (8).

3. A unit as claimed in claim 2, wherein said unloading means (7) comprise pocket means (22) movable through said output (8) and said switch station (23) along said unloading path (P2) and in a third supply direction (D3).

4. A unit as claimed in claim 3, wherein said second supply means (24, 26) comprise blade means (26) movable selectively through said pockets (27) at said switch station (23).

5. A unit as claimed in claim 4, wherein said blade means (26) move back and forth in said second supply direction (D2) and crosswise to said pocket means (22).

6. A unit as claimed in claim 3, wherein said pocket means (22) comprise a number of pockets (27) arranged side by side in said third supply direction (D3); each pocket (27) receiving a respective stack (2) at the output (8) of said stacking means (4).

7. A unit as claimed in claim 3, wherein said third supply direction (D3) is parallel to said first supply direction (D1).

8. A unit as claimed in claim 1, wherein said stacking means (4) comprise two screws (12) rotating in opposite directions about respective axes (12a) of rotation crosswise to said first supply direction (D1).

9. A unit as claimed in claim 8, wherein said two screws (12) comprise respective oppositely-inclined threads (14) substantially tangent to said input (6) and defining a surface (15) for forming said stacks (2).

* * * * *